United States Patent Office 3,420,659
Patented Jan. 7, 1969

3,420,659
METHOD FOR THE PRODUCTION OF VANADIUM ALLOYS
Heinrich W. Rathmann and Robert T. C. Rasmussen, Cambridge, Ohio, assignors to Foote Mineral Company, Exton, Pa., a corporation of Pennsylvania
No Drawing. Filed Oct. 11, 1967, Ser. No. 674,633
U.S. Cl. 75—84      11 Claims
Int. Cl. C22b 55/00

ABSTRACT OF THE DISCLOSURE

Vanadium-bearing slags, with silica, flux, and carbonaceous reducer are smelted to produce a primary vanadium silicide having 25–60 percent silicon. The primary silicide is refined with lime and vanadium-bearing slag or a vanadium oxide to produce a vanadium alloy having a silicon content less than 20 percent.

---

Our invention relates to the production of vanadium alloys, and, more particularly, to a method for the economical production of vanadium alloys from vanadium-bearing materials.

High carbon ferrovanadium has been produced heretofore by carbon reduction of vanadium-bearing raw materials; however, such a smelting operation is difficult due to the buildup of high melting vanadium carbide in the furnace. Ferrovanadium is normally produced by alumino-thermic or alumino-electric reduction of vanadium pentoxide. Ferrovanadium produced in this manner is relatively expensive because of the high cost of obtaining pure $V_2O_5$ due to the expensive chemical processing required in its manufacture, and also because aluminum is a high cost reducer as compared with carbon.

With a substantial and rapidly growing need for vanadium by the steel industry, a less expensive supply of vanadium alloy is needed. Our invention fulfills this need, providing a method for economically producing vanadium alloys by carbon reduction of vanadium-containing slags to produce a vanadium silicide alloy which is subsequently reacted with vanadium pentoxide or other vanadium-containing materials to increase the vanadium content and reduce the silicon content of the alloy.

An important and increasing source of vanadium is from raw materials containing small or trace amounts thereof. These materials cannot be processed economically for vanadium recovery alone. However, in processing these raw materials for other elements, the vanadium is frequently concentrated in a slag or other by-product from which it may be recovered economically. For example, slags resulting from processing of vanadium-bearing iron ores generally contain from 2 to 15 percent $V_2O_5$ but in some cases up to 25–30 percent. (Although throughout we shall refer to the vanadium analysis as $V_2O_5$, it will be understood by those skilled in the art that the vanadium content may exist partially or entirely in some other form, such as $V_2O_3$, $V_2O_4$ or some other compound.) Ferrophosphorus obtained as a by-product of the production of elemental phosphorus by the electric furnace smelting of western phosphate rock contains up to 8 percent vanadium, which is equivalent to 14 percent vanadium pentoxide. Also, boiler residues resulting from the burning of fuel oil contain from 2 percent to approximately 80 percent vanadium pentoxide. The residues from the processing of chromium, titanium and zirconium ores and spent vanadium catalysts from the chemical industry are also available for vanadium recovery.

Most of these materials can be processed in a manner similar to vanadium ore to recover a relatively pure vanadium oxide. Frequently, the vanadium content is sufficiently high to be of interest for the production of vanadium-iron alloy directly and without recourse to expensive chemical processing. However, this has not been economically feasible using present aluminum reduction methods because of the high cost of aluminum which is required to reduce not only the vanadium oxide, but also the other oxides in the slag, such as iron oxide.

Our invention, on the other hand, provides an improved method for producing vanadium-iron or vanadium-iron-silicon alloys by the direct smelting of vanadium-bearing slags or other vanadium-bearing materials. Our method eliminates the difficulties encountered in the carbon reduction of vanadium by inhibiting the formation of vanadium carbide. Using our method it is possible to produce alloys containing 20–40 percent vanadium which are in the low melting range of the iron-vanadium system which is advantageous both in the manufacture of the alloys and their use as additives to steel baths.

Briefly stated, our method is a two step process. In the first step vanadium-containing material is smelted with silica, flux and a carbonaceous reducer to produce a primary vanadium silicide having a silicon content of 25 to 60 percent. In the second step the vanadium silicide is refined with lime and a vanadium-containing material to increase the vanadium content and decrease the silicon content to less than 20 percent. The vanadium-containing material used for refining may be vanadium pentoxide or it may be the same type of vanadium raw material used in the first step. If the vanadium raw material has a high iron to vanadium ratio, it may be desirable to beneficiate the vanadium-containing raw material to provide a de-ironed vanadium-bearing material before refining. The refining step may also be carried out in two stages. In two stage refining, the primary silicide is melted with an intermediate slag from a previous refining operation which yields a secondary silicide and a waste slag. The secondary silicide is melted with vanadium-containing material and lime which yields the final vanadium alloy and an intermediate slag for future use.

A wide variety of vanadium-bearing raw materials can be used in our process, such as vanadium-bearing slags and residues. Generally, we consider 15 percent vanadium pentoxide as a minimum average vanadium content of raw material in the charge and about 60 percent as the maximum vanadium content. Raw materials containing more than 60 percent vanadium pentoxide can be economically processed by the conventional aluminum reduction. However, it is to be understood, that individual raw materials outside this range can be used and, furthermore, such raw materials can be blended advantageously with other raw materials, particularly if they contain other needed elements. For example, a spent catalyst containing 5 percent vanadium pentoxide and the balance comprising mostly silicon dioxide could be used in a charge in an amount up to the maximum that would fill the requirement for silicon in the alloy and silica in the slag. A slag resulting from the alumino-thermic production of ferrovanadium, which is primarily calcium aluminate with up to about 11 percent $V_2O_5$, could be used in the charge to supply both CaO and $Al_2O_3$ flux in an amount up to the maximum CaO or $Al_2O_3$ requirement, whichever is reached first. Moreover, vanadium raw materials having relatively low ratios of vanadium to more readily reducible metals, such as nickel, iron, chromium, and manganese, can be used in the charge to the extent that these other metals can be tolerated in the final vanadium alloy product. In Table I we have shown the analysis of two slags and a residue to illustrate materials which we have used successfully in our process.

TABLE I

| Constituent, percent | Vanadium raw material | | |
|---|---|---|---|
| | Slag A | Slag B | Residue |
| $V_2O_5$ | 22.05 | 17.50 | 35.25 |
| Fe, metallic | 12.76 | 15.50 | |
| FeO | 33.59 | 37.50 | |
| Total iron as Fe | 38.87 | 44.65 | 2.24 |
| $Al_2O_3$ | 5.88 | 4.21 | 1.76 |
| CaO | 0.30 | 0.61 | 0.22 |
| MgO | 1.19 | 0.72 | 39.25 |
| $SiO_2$ | 17.57 | 16.74 | 6.54 |
| $Cr_2O_3$ | 1.97 | 1.43 | |
| $TiO_2$ | 7.22 | 5.71 | |
| MnO | 1.92 | 1.21 | |
| NiO | | | 3.19 |

Our process comprises two steps, a smelting step and a refining step. Although the smelting step is always the same, the refining step may be carried out in one or two stages depending upon the composition of the final alloy desired.

The first step is submerged-arc smelting of the vanadium raw material with the required silica, flux and carbonaceous reducer to produce primary vanadium silicide analyzing 25 to 60 percent silicon, preferably at least 35 percent silicon to assure that carbides will be at a low level. This is a continuous operation in which charge mix is fed to the furnace more or less continuously to keep the charge level fairly constant near the top of the furnace. The furnace is tapped periodically, usually every two hours, to drain alloy and slag from beneath the charge column. The primary vanadium silicide may be cast and milled for subsequent refining, or it may be passed directly to the refining step in the molten state.

Primary vanadium silicide was produced experimentally in a six-day campaign in a 1,200 kva. three-phase furnace. Several vanadium-bearing residues and a vanadium-bearing slag comprised the vanadium raw materials smelted. The furnace charge was varied during the campaign as needed to meet the desired alloy composition and furnace conditions. A typical charge mix containing Slag B and residue shown in Table I which was used on the fifth day of the campaign is shown in Table II.

TABLE II

| Mix constituent: | Pounds |
|---|---|
| Slag B | 100 |
| Residue | 40 |
| Silica pebble | 250 |
| Wood chips | 100 |
| Coke | 68 |
| Coal | 64 |

The primary vanadium silicide tapped on the fifth day had the average analysis shown in Table III. For convenience in experimental operations, all the primary silicide produced in the campaign was cast for use in subsequent refining tests.

TABLE III

| Element | Percent |
|---|---|
| Vanadium | 18.97 |
| Silicon | 42.02 |
| Iron | 32.16 |
| Manganese | 0.74 |
| Chromium | 0.78 |
| Nickel | 1.32 |
| Titanium | 2.40 |
| Carbon | 0.47 |

The recovery and accountability of vanadium for the entire smelting campaign are summarized in Table IV.

TABLE IV

| Product: | Weight percent of inbound vanadium |
|---|---|
| Recovery in tapped alloy | 54.7 |
| Recycle products | 36.0 |
| Lost in waste slag | 3.2 |
| Unaccounted | 6.1 |
| Total | 100.0 |

The recycle products include off-grade alloy, cleanings and furnace skull which can be returned to the furnace for recovery of most of their vanadium content in a sustained production operation. The primary silicide thus produced may be cast and milled prior to refining or it may be passed directly to the refining operation in the molten state.

In the second step of our process, the primary vanadium silicide is further processed to produce the desired vanadium-iron or vanadium-iron-silicon alloy. The refining operation has a two-fold purpose: (1) to lower the silicon content of the primary vanadium silicide to a level required by the steel industry, and (2) to utilize the silicon as a reducing agent to add vanadium to the refined alloy. To this end, the primary vanadium silicide is melted with lime and a vanadium-bearing refining agent. The silicon in the primary vanadium silicide reduces the vanadium-bearing refining agent whereby the silicon content of the alloy is decreased and the vanadium content of the alloy is increased.

The vanadium-bearing refining agent may be any oxygen-bearing vanadium material, such as vanadium pentoxide, or the same type of vanadium raw material used for producing the primary vanadium silicide. Use of either will depend primarily upon the vanadium content desired in the final product and economic considerations. However, the vanadium raw material should contain at least 15 percent vanadium pentoxide with an iron content sufficiently low to avoid diluting the vanadium content of the final alloy below that of an acceptable level.

If it is desired to use a vanadium slag having a high ratio of iron to vanadium as the refining agent, the slag may be beneficiated before use. This can be accomplished by melting the vanadium slag with lime and then treating the melt with sufficient primary silicide to reduce a substantial part of the iron contained in the raw material to a metal, while at the same time oxidizing the vanadium and also the silicon, titanium, manganese, and chromium from the silicide into a de-ironed slag which can be used as the refining agent. The primary silicide used in the beneficiation should contain sufficient silicon equivalent to reduce most of the iron oxide in the vanadium-bearing slag to a metal; at the same time, the silicon equivalent must be kept low enough to cause most of the vanadium present in both the raw material and the silicide to report to the de-ironed slag product. As those skilled in the art will understand, the silicon equivalent, as used herein, means the silicon content plus the content of other elements in the silicide that are high enough in the electromotive series to reduce FeO to Fe, the other elements being calculated to an equivalent quantity of silicon with respect to their reducing power. These other elements, for example, are titanium, vanadium, manganese, and chromium. We have found that for optimum beneficiation, the primary silicide used should contain a silicon equivalent of about 72.7 percent of that theoretically necessary to reduce all the FeO to Fe. Using that amount of primary silicide, we have been able to obtain a 98.8 percent recovery of the vanadium in the de-ironed slag and a rejection of 78.7 percent of the total iron contained in the raw material to the metal product. Any nickel or copper present in the charge would also be rejected to the metal. The lime added to flux the resulting oxides of silicon, titanium, vanadium, manganese, and chromium in the de-ironed slag dilutes the vanadium in the slag but is useful in the subsequent reduction of vanadium from the slag. The composition of a typical de-ironed vanadium bearing slag is set forth in Table V.

TABLE V

| Constituent: | De-ironed vanadium bearing slag, percent |
|---|---|
| Vanadium | 10.20 |
| Iron | 6.58 |
| Titanium | 4.56 |
| Chromium | 1.11 |
| Manganese | 1.12 |
| $SiO_2$ | 20.22 |
| $Al_2O_3$ | 5.40 |
| CaO | 31.02 |
| MgO | 7.53 |

The refining of the primary vanadium silicide in accordance with our process may be carried out in one or two stages, depending upon the silicon content desired in the final alloy. It is desirable for economic alloy production to have the vanadium content of the discarded slag below 2 percent, and preferably below 1 percent vanadium. We have found that slags below these vanadium levels can be achieved by a single stage refining step to produce a final alloy product containing 10 to 20 percent silicon. If a final alloy product containing less than 10 percent silicon is desired, for example 1 percent silicon or less, it is necessary to carry out the refining operation in two steps.

In the single stage refining operation, the primary vanadium silicide is melted with lime and a vanadium-containing refining agent which may be vanadium pentoxide, vanadium slag or de-ironed vanadium-bearing slag. We have found that optimum results are obtained with use of enough primary vanadium silicide to provide about 180 percent of the silicon equivalent theoretically required to reduce the oxides of vanadium, iron, chromium and manganese contained in the refining agent. The silicon equivalent in this case is the silicon plus the equivalent of only the titanium. Sufficient lime is added to produce di-calcium silicate in the waste slag product.

Example 1

In one refining operation we melted a charge comprising 75 pounds vanadium pentoxide (54.00 percent vanadium), 120 pounds of primary vanadium silicide having the composition set forth in Table VI and 126 pounds of pebble lime.

TABLE VI

| Constituent: | Primary vanadium silicide, percent |
|---|---|
| Vanadium | 15.65 |
| Iron | 33.80 |
| Titanium | 2.40 |
| Chromium | .77 |
| Manganese | .68 |
| Silicon | 43.64 |
| Nickel | .92 |
| Carbon | .23 |

We obtained 116.5 pounds of an alloy which contained 44.46 percent vanadium, 34.85 percent iron, 16.97 percent silicon, 0.95 percent chromium, 0.71 percent manganese, 0.91 percent nickel, 0.92 percent titanium and 0.23 percent carbon. The vanadium loss to the waste slag was 5.6 percent of the inbound vanadium.

Example 2

In another single stage refining operation, we melted a charge comprising 60 pounds of vanadium pentoxide, 82 pounds of vanadium bearing residue (35.25 percent $V_2O_5$), 134 pounds of primary vanadium silicide having the composition set forth in Table VI and 95 pounds of pebble lime. We obtained 126 pounds of alloy analyzing 44.78 percent vanadium, 35.68 percent iron, 14.90 percent silicon, 0.94 percent chromium, 0.63 percent manganese, 2.38 percent nickel, 0.36 percent titanium and 0.33 percent carbon. In this case the vanadium loss in the waste slag was approximately 8.4 percent of the inbound vanadium.

The two stage refining operation is a countercurrent cyclic process in which in the first stage a secondary vanadium silicide produced in the second stage of a previous operation is melted with lime and a vanadium bearing refining agent to obtain the final ferro-vanadium alloy and an intermediate slag. In the second stage, the intermediate slag from the first stage is melted with primary vanadium silicide from the smelting step to produce additional secondary vanadium silicide and a waste slag. As in the single stage refining operation, the vanadium bearing refining agent can be vanadium bearing slag, de-ironed vanadium bearing slag, vanadium bearing residue or vanadium pentoxide. We have been particularly successful using de-ironed vanadium-bearing slag, vanadium-bearing residues and vanadium pentoxide as all or part of the refining agent.

Example 3

In one two stage refining operation, we arc melted a mixture of 87 pounds of secondary vanadium silicide and 75 pounds of vanadium pentoxide and 175 pounds of pebble lime. From this first stage, we obtained 78 pounds of ferrovanadium product and 266 pounds of an intermediate slag. In the second stage, we arc melted a mixture of 262 pounds of the intermediate slag from the first stage and 97 pounds of primary vanadium silicide. From this second stage we obtained 87 pounds of secondary vanadium silicide and 266 pounds of waste slag.

The silicon equivalent theory was 73.2 percent of the first stage and 145.6 percent overall for both stages. The pebble lime addition was calculated at 95.2 percent CaO theory to produce di-calcium silicate based upon the overall silicon equivalent theory. The analyses of inbound and outbound materials and the overall vanadium balance for the two stages are set forth in Table VII.

TABLE VII

| Charge material or product | Weight, pounds | Analysis, percent | | | Vanadium | |
|---|---|---|---|---|---|---|
| | | V | Si | Ti | Pounds | Percent of inbound |
| Overall inbound: | | | | | | |
| Secondary vanadium silicide | 87 | 33.89 | 23.33 | 3.36 | 29.48 | 34.6 |
| Vanadium pentoxide | 75 | 54.00 | | | 40.50 | 47.6 |
| Pebble lime | 175 | | | | | |
| Primary vanadium silicide | 97 | 15.65 | 43.64 | 2.40 | 15.18 | 17.8 |
| Total inbound | 434 | | | | 85.16 | 100.0 |
| Overall outbound: | | | | | | |
| Ferrovandium | 78 | 55.80 | .78 | Nil | 43.52 | 51.3 |
| Secondary vanadium silicide | 87 | 35.35 | 22.16 | 3.28 | 30.75 | 36.3 |
| Total useful products | 165 | | | | 74.27 | 87.6 |
| Waste slag | 257 | .70 | | | 1.80 | 2.1 |
| Total products | 422 | | | | 76.07 | 89.7 |

The intermediate slag produced in the first stage and consumed in the second stage is not shown because it does not enter into the vanadium balance; it analyzed 9.10 percent vanadium. Since only 262 pounds of the 266 pounds of intermediate slag produced was consumed, the 0.36 pound of vanadium contained in the 4 pounds not consumed was substracted from the 85.16 pounds of inbound vanadium in calculating the vanadium recovered in the outbound products. With this adjustment, 89.7 percent of the inbound vanadium was accounted for in the products. Accountability and recovery of vanadium would be higher in production scale operations. Most of the inbound iron, chromium and manganese is recovered in the ferrovanadium product.

In other operations, we have substituted de-ironed vanadium-bearing slag for the fused vanadium pentoxide used in the foregoing example. In such operations we have obtained a ferrovanadium product containing 37 percent vanadium. In operations in which vanadium-bearing slag has not been beneficiated or de-ironed, we have produced ferrovanadium analyzing 20 to 30 percent vanadium.

In the practice of this invention the refining reactions can be carried out molten to molten, or the primary and/or secondary vanadium silicide can be cast and milled for addition to a refining melt. For instance, the intermediate slag normally would be treated in the molten state with either molten or solid primary vanadium silicide. While it was more practical in most of the small scale tests to use all solid reagents, tests were made successfully on two stage refining in which molten intermediate slag was treated with solid primary vanadium silicide. In single stage refining to produce final alloy analyzing 10 to 20 percent silicon, the preferred practice would be to melt the vanadium-bearing refining material with lime and treat the melt with either molten or solid primary vanadium silicide.

From the foregoing, it will be seen that we have invented a direct smelting and refining process which permits the economic production of vanadium alloys from vanadium-bearing materials including slags and residues. The difficulties encountered in the production of ferrovanadium by carbon reduction of vanadium-bearing materials are avoided by producing instead a primary vanadium silicide to inhibit the formation of vanadium carbide which causes buildup of accretions in the smelting furnace. Most, or part, of the silicon content of the primary vanadium silicide is utilized as a low cost reducing agent in the refining step to reduce vanadium units from the vanadium-bearing refining agent.

While we have described the presently preferred embodiments of our invention, it should be understood that it may otherwise be embodied within the scope of the appended claims.

We claim:
1. A process for the production of vanadium alloys from vanadium-bearing materials comprising:
   (A) smelting a vanadium-bearing material with silica, flux and carbonaceous reducer to produce a primary vanadium silicide having a silicon content of 25 to 60 percent;
   (B) refining the primary silicide by melting with lime and a vanadium-bearing material to produce a vanadium alloy having a silicon content of less than 20 percent by weight.

2. The process as set forth in claim 1 in which the vanadium-bearing material used in step B is selected from the group consisting of vanadium pentoxide, vanadium-bearing slag, de-ironed vanadium-bearing slag, and vanadium-bearing residues.

3. The process as set forth in claim 1 in which the vanadium-bearing material used in step B is a vanadium-bearing slag, and prior to use, melting the vanadium-bearing slag with lime and primary vanadium silicide to reduce the iron content in the slag.

4. The process as set forth in claim 3 in which the primary silicide melted with the vanadium-bearing slag prior to step B contains about 70 percent of the silicon equivalent theoretically required to reduce the iron oxide in the slag to iron.

5. The process as set forth in claim 1 wherein said vanadium silicide used in step B contains about 180 percent of the silicon equivalent theoretically required to reduce vanadium, iron, chromium and manganese oxide contained in the vanadium-bearing material and wherein said lime used is about 90 to 110 percent of the CaO required to produce di-calcium silicate slag.

6. A process for the production of vanadium alloys from vanadium-bearing material comprising:
   (A) smelting a vanadium-bearing material with silica, flux and carbonaceous reducer to produce a primary vanadium silicide having a silicon content of 25 to 60 percent;
   (B) melting the primary silicide with an intermediate slag formed in a previous heat to form a secondary silicide having a lower silicon content and a waste slag; and,
   (C) melting the secondary silicide with lime and vanadium-bearing material to produce a vanadium alloy having a silicon content less than 10 percent and produce an intermediate slag for use in step B of a subsequent operation.

7. The process as set forth in claim 6 in which the vanadium-bearing material used in step C is selected from the group consisting of vanadium pentoxide, vanadium-bearing slag, de-ironed vanadium-bearing slag, and vanadium-bearing residue.

8. The process as set forth in claim 6 in which the vanadium-bearing material used in step C is a vanadium-bearing slag, and prior to use, melting the vanadium-bearing slag with lime and primary vanadium silicide to reduce the iron content in the slag.

9. The process as set forth in claim 8 in which the primary silicide melted with the vanadium-bearing slag prior to step C contains about 70 percent of the silicon equivalent theoretically required to reduce the iron oxide in the slag to iron.

10. The process as set forth in claim 6 in which the secondary silicide used in step C contains about 70 percent of the silicon equivalent theoretically necessary to reduce the vanadium, iron, chromium and manganese oxides present in the melt.

11. The process as set forth in claim 6 in which the primary silicide present in step B contains about 150 percent of the silicon equivalent theoretically required to reduce to metal the vanadium, iron, chromium and manganese oxides present in the vanadium-bearing material used in step C.

References Cited

UNITED STATES PATENTS

| | | | |
|---|---|---|---|
| 1,727,180 | 9/1929 | Saklatwalla | 75—134 |
| 1,814,720 | 7/1931 | Marden et al. | 75—84 X |
| 2,576,763 | 11/1951 | Linz | 75—135 X |
| 2,919,189 | 12/1959 | Nossen et al. | 75—84 X |

CARL D. QUARFORTH, *Primary Examiner.*

M. J. SCOLNICK, *Assistant Examiner.*

U.S. Cl. X.R.

75—134, 135